June 30, 1964 R. D. FRACASSI 3,139,605
ERROR DETECTING APPARATUS TO SECURE TRANSMISSION OF BINARY DATA
Filed Dec. 27, 1961 3 Sheets-Sheet 1
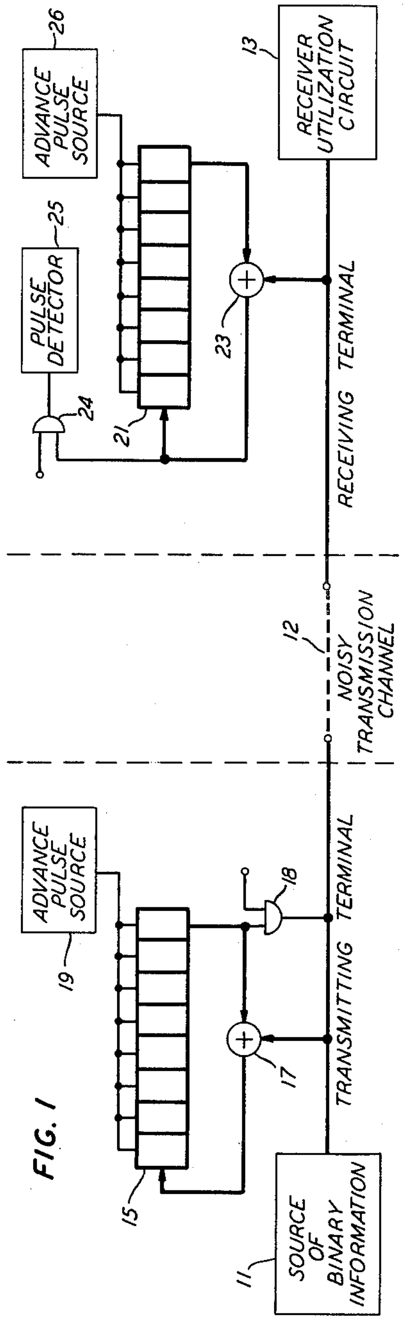
FIG. 1
| TIME INTERVAL | TRANS-MITTED DATA | RCV'D DATA | RECEIVING END SHIFT REG. STAGES 1 | 2 | 3 | 4 | 5 | 6 | 7 | 8 |
|---|---|---|---|---|---|---|---|---|---|---|
| 1 | 1 | 1 | 0 | 0 | 0 | 0 | 0 | 0 | 0 | 0 |
| 2 | 1 | 0 | 1 | 0 | 0 | 0 | 0 | 0 | 0 | 0 |
| 3 | 0 | 0 | 0 | 1 | 0 | 0 | 0 | 0 | 0 | 0 |
| 4 | 0 | 0 | 0 | 0 | 1 | 0 | 0 | 0 | 0 | 0 |
| 5 | 1 | 1 | 0 | 0 | 0 | 1 | 0 | 0 | 0 | 0 |
| 6 | 0 | 0 | 1 | 0 | 0 | 0 | 1 | 0 | 0 | 0 |
| 7 | 1 | 1 | 0 | 1 | 0 | 0 | 0 | 1 | 0 | 0 |
| 8 | 1 | 1 | 1 | 0 | 1 | 0 | 0 | 0 | 1 | 0 |
| 9 | 0 | 0 | 1 | 1 | 0 | 1 | 0 | 0 | 0 | 1 |
| 10 | 1 | 1 | 1 | 1 | 1 | 0 | 1 | 0 | 0 | 0 |
| 11 | 1 | 1 | 1 | 1 | 1 | 1 | 0 | 1 | 0 | 0 |
| 12 | 0 | 0 | 1 | 1 | 1 | 1 | 1 | 0 | 1 | 0 |
| 13 | 0 | 0 | 0 | 1 | 1 | 1 | 1 | 1 | 0 | 1 |
FIG. 3
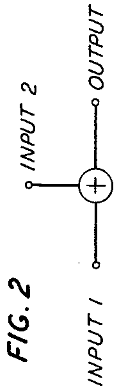
| 1 | 2 | OUTPUT |
|---|---|---|
| 0 | 0 | 0 |
| 1 | 1 | 0 |
| 0 | 1 | 1 |
| 1 | 0 | 1 |
FIG. 2
INVENTOR
R. D. FRACASSI
BY Roy M. Porter Jr.
ATTORNEY

| TIME INTERVAL | M | 1 | 2 | 3 | 4 | 5 | 6 | 7 | 8 | (A) 8+M | (B) 3+7 | A+B |
|---|---|---|---|---|---|---|---|---|---|---|---|---|
| 1 | 0 | 0 | 0 | 0 | 0 | 0 | 0 | 0 | 0 | 0 | 0 | 0 |
| 2 | 1 | 0 | 0 | 0 | 0 | 0 | 0 | 0 | 0 | 1 | 0 | 1 |
| 3 | 0 | 1 | 0 | 0 | 0 | 0 | 0 | 0 | 0 | 0 | 0 | 0 |
| 4 | 0 | 0 | 1 | 0 | 0 | 0 | 0 | 0 | 0 | 0 | 0 | 0 |
| 5 | 0 | 0 | 0 | 1 | 0 | 0 | 0 | 0 | 0 | 0 | 1 | 1 |
| 6 | 0 | 1 | 0 | 0 | 1 | 0 | 0 | 0 | 0 | 0 | 0 | 0 |
| 7 | 0 | 0 | 1 | 0 | 0 | 1 | 0 | 0 | 0 | 0 | 0 | 0 |
| 8 | 0 | 0 | 0 | 1 | 0 | 0 | 1 | 0 | 0 | 0 | 1 | 1 |
| 9 | 0 | 1 | 0 | 0 | 1 | 0 | 0 | 1 | 0 | 0 | 1 | 1 |
| 10 | 0 | 1 | 1 | 0 | 0 | 1 | 0 | 0 | 1 | 1 | 0 | 1 |
| 11 | 0 | 1 | 1 | 1 | 0 | 0 | 1 | 0 | 0 | 0 | 1 | 1 |
| 12 | 0 | 1 | 1 | 1 | 1 | 0 | 0 | 1 | 0 | 0 | 0 | 0 |
| 13 | 0 | 0 | 1 | 1 | 1 | 1 | 0 | 0 | 1 | 1 | 1 | 0 |
| 14 | 0 | 0 | 0 | 1 | 1 | 1 | 1 | 0 | 0 | 0 | 1 | 1 |
| 15 | 0 | 1 | 0 | 0 | 1 | 1 | 1 | 1 | 0 | 0 | 1 | 1 |

INVENTOR
R. D. FRACASSI
BY Roy M. Porter Jr.
ATTORNEY

| TIME INTERVAL | M | 1 | 2 | 3 | 4 | 5 | 6 | 7 | 8 | C |
|---|---|---|---|---|---|---|---|---|---|---|
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 1 | 0 | 0 | 0 | 0 | 0 | 0 | 0 | 0 | 0 |
| 4 | 0 | 1 | 0 | 0 | 0 | 0 | 0 | 0 | 0 | 1 |
| 5 | 0 | 1 | 1 | 0 | 0 | 0 | 0 | 0 | 0 | 1 |
| 6 | 0 | 1 | 1 | 1 | 0 | 0 | 0 | 0 | 0 | 0 |
| 7 | 0 | 0 | 1 | 1 | 1 | 0 | 0 | 0 | 0 | 1 |
| 8 | 0 | 1 | 0 | 1 | 1 | 1 | 0 | 0 | 0 | 1 |
| 9 | 0 | 1 | 1 | 0 | 1 | 1 | 1 | 0 | 0 | 0 |

INVENTOR
R. D. FRACASSI
BY Ray M. Porter, Jr.
ATTORNEY

United States Patent Office 3,139,605
Patented June 30, 1964

3,139,605

ERROR DETECTING APPARATUS TO SECURE TRANSMISSION OF BINARY DATA

Renato D. Fracassi, Chatham, N.J., assignor to Bell Telephone Laboratories, Incorporated, New York, N.Y., a corporation of New York Filed Dec. 27, 1961, Ser. No. 162,600
3 Claims. (Cl. 340—146.1)

This invention relates to digital information processing systems, and more particularly, to arrangements for detecting errors committed during the transmission of binary data.

Recent advances in the state of the communication system art have greatly increased the reliability of data transmission. By minimizing the undesirable effects of noise and momentary equipment failure, it has been possible to greatly reduce the number of errors normally committed during the transmission of message data. Some arrangements, such as diversity systems or systems using error correcting apparatus, are capable of substantially error-free transmission. The inordinate expense of providing such facilities, however, limits their feasible use to only those applications where the highest reliability is required. In consequence, most data transmission facilities which are now in use are subject to a small but significant probability of error occurrence.

In some instances, a small number of data errors may be even more detrimental than a large number. This is particularly true since a small number of errors in a correspondence may go unnoticed while the gibberish resulting from a badly damaged transmission would be apparent. By way of example, consider the misleading nature of a message of business negotiation where only a single number in a price quotation is altered by a transmission error. It is, therefore, desirable that some method of detecting errors be employed even though the means of transmission is quite reliable.

A number of highly refined error detection arrangements have been developed. These systems generally involve encoding circuits for converting code "words," each having a fixed number of digits, into modified words having additional digits. The redundancy of the information within the word allows the decoder to detect transmission errors. These arrangements, while quite effective, are often so expensive as to be impractical in most applications.

It is, therefore, a principal object of the present invention to detect errors committed during the transmission of binary data and to achieve such detection in a simple and effective manner.

A further disadvantage inherent in most of the prior detection arrangements results from the coding process itself. Since the message is encoded for transmission, a malfunction in either the encoding or decoding apparatus generally disables the entire system.

Accordingly, it is a further object of the present invention to accomplish error detection without altering the form of the message data to be transmitted.

It is a still further object of the invention to detect errors in a flexible manner such that the detection circuitry may be altered in accordance with the particular kind of error distribution which is likely to be encountered on a given transmission facility.

In accordance with the invention, these and other objects are achieved simply and effectively by the use of an "error memory" arrangement at both the transmitting and receiving terminals of the communication channel. Each "error memory" comprises a multistage shift register and at least one modulo-2 adder. At both ends of the transmission channel, data from the channel is mixed by modulo-2 addition with data stored in the shift register and the resulting sum is fed back in the first stage of the register. In accordance with a principal feature of the present invention, the data circulating through each shift register is continually modified by the data from the transmission path such that the binary states of the register stages are, at any instant, representative of the entire past history of the message passing over the transmission channel. Had any previous message digit been different from the digit actually obtained from the channel, the state of at least one of the register stages would also be different.

If there is no error in transmission, both "error memory" circuits will receive identical information from the transmission channel and, consequently, the binary state of each stage of the transmitting-end shift register will, at any instant, be identical to the state of the respective stage of the receiving-end shift register. At the conclusion of the message, the states of the two registers may be compared (in several ways) and, if any dissimilarity exists, an error in the transmission of the message data will be indicated.

A better understanding of the present invention and of the objects, features, and advantages thereof may be gained from a consideration of the following detailed description of three illustrative embodiments of the invention. These embodiments are presented in conjunction with the accompanying drawings, in which:

FIG. 1 is a schematic drawing of a simplified embodiment which is illustrative of the principles of the invention;

FIG. 2 is a schematic diagram and tabular listing which illustrate the operation of the modulo-2 adders employed in the invention;

FIG. 3 is a tabular representation of the operation of the error checking arrangement shown in FIG. 1;

Figures 4, 5:
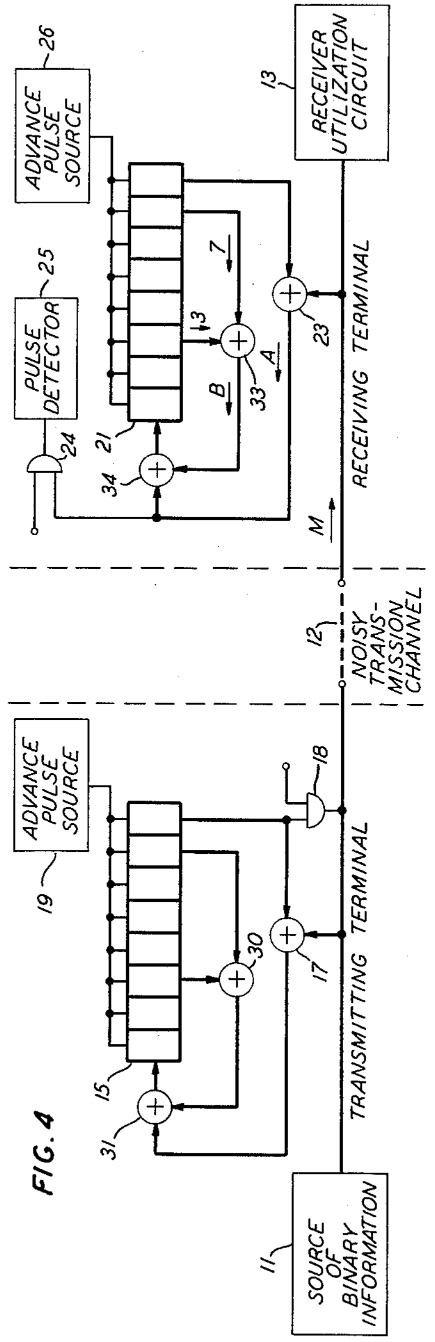
FIG. 4 is a schematic drawing of a further embodiment of the present invention.
FIG. 5 illustrates the operation of the embodiment of FIG. 4 by means of tabular listings.

In the communication system shown in FIG. 1 of the drawings, binary information from the source 11 is transmitted over a transmission channel 12 to a utilization circuit 13 located in the receiving terminal. In order to detect possible errors in transmission, both the transmitting and receiving terminals are equipped with an "error memory" arrangement comprising shift registers 15 and 21 and modulo-2 adders 17 and 23. The shift registers used in this arrangement are each made up of a series of bistable devices connected in tandem. Each of these "flip-flop" stages is coupled to the next by an interstage gate. The shift registers operate in such a way that the binary state of any given stage is the same as the binary state of the stage preceding it in the series during the previous time interval. If an "ON pulse" is applied to the first stage of the register, for example, this stage will be turned ON. This ON condition will then pass from stage to stage along the counter, advancing one stage each time an "advance pulse" is applied to the interstage gates. Typical shifter register circuitry is disclosed in U.S. Patent 2,951,230 which issued to W. J. Cadden on August 30, 1960. Other types of delay apparatus may be substituted for the shift registers shown in the drawings.

FIG. 2 of the drawings illustrates the operation of the modulo-2 adders employed in the invention. Each of these adders is provided with first and second inputs and a single output. The adders perform modulo-2 addition (sometimes termed the EXCLUSIVE-OR logic function) as shown in tabular form below the schematic drawing of the adder. Such an adder is characterized in that an ON pulse is delivered to its output if, any only if, unlike pulses are applied to its two inputs. Specific circuitry for performing modulo-2 addition is disclosed in U.S. Patent 2,908,828 which issued to E. C. Thompson on October 13, 1959.

As shown in FIG. 1, an eight-stage shift register 15 is interconnected at the transmitting terminal with a modulo-2 adder 17. The output from the last stage of register 15 is applied to one input of the adder 17. The other input to adder 17 is directly connected to the transmission path such that it receives binary message data from the source 11. The output data from the adder 17, which is the modulo-2 sum of the transmitted data and the data from the last stage of the shift register 15, is then applied to the input stage of register 15. An AND gate 18 is interposed between the output of the last stage of register 15 and the transmission channel. As will be discussed below, AND gate 18 is normally de-energized such that data is not allowed to pass from the register to the transmission channel until the message has been completely transmitted. Advance pulses from the source 19 are applied to the interstage gates of the shift register 15.

A similar arrangement comprising shift register 21 and modulo-2 adder 23 is connected to the transmission channel at the receiving terminal. It should be noted that the manner of interconnecting the shift register and the modulo-2 adder to the transmission channel is identical at both the transmitting and receiving terminals. An AND gate 24 is interposed between the output of modulo-2 adder 23 and a pulse detector 25 at the receiving terminal. Like AND gate 18, the AND gate 24 is normally de-energized such that pulses are allowed to pass to the pulse detector only after the conclusion of the message transmission. Advance pulses from the source 26 are applied to the interstage gates of shift register 21.

FIG. 3 of the drawings depicts the operation of the embodiment illustrated in FIG. 1 as shown in FIG. 3, during the first time interval all of the stages of both shift registers have been preset to the binary state "0." During the first time interval of the message, a "1" is transmitted as an ON pulse from the information source 11 to the utilization circuit 13. Since this pulse was transmitted without error (as can be seen by a comparison of the transmitted and receiving signal columns in FIG. 3), a "1" is applied to the input of both modulo-2 adder 17 and adder 23. During the second time interval, this "1" appears in the first stage of both shift registers 15 and 21, all other stages of both registers remaining in the "0" state. During the second time interval a transmission error was committed, however, since a "1" was transmitted and a "0" was received. At the transmitting terminal, the "1" which was transmitted during the second time interval appears in the first stage of shift register 15 during the third time interval, in the second stage during the fourth time interval, and so on, until during the tenth time interval it has advanced to the eighth stage. At the receiving terminal, however, a "0" advance concurrently through respective stages of register 21 until, during the tenth time interval, a "0" is in the eighth stage. This "0" is mixed by modulo-2 addition with the "1" transmitted in the tenth time interval and, consequently, a "1" appears in the first stage of the register 21 during the eleventh time interval. In contrast, the last stage of shift register 15 was in binary state "1" during the tenth time interval. This state when mixed with the transmitted "1" applies a "0" to the input of shift register 15 such that, as before, the two shift registers still contain dissimilar data. It is important to note that the "error" circulating through the shift register 21 is not "erased" by subsequent transmitted pulses but rather has a lasting effect upon the information stored in the receiving-end shift register.

At the conclusion of the message transmission (which may be several thousand digits long), the binary states of respective stages of the two registers may be compared. Provided no error was committed during the transmission of message data, each stage of shift register 15 should be in a binary state which is identical to the state of the respective stage of shift register 21. In order to compare the respective stages of the two registers, both AND gate 18 at the transmitting terminal and AND gate 24 at the receiving terminal are energized. The contents of shift register 15 are then transmitted over the channel 12 to the input of the modulo-2 adder 23. If the two registers contain identical information, the two inputs to adder 23 will be identical; consequently, no pulse will be delivered to the pulse detector 25. If all of the respective stages of the two registers are not in identical states, however, pulse detector 25 will indicate an error of transmission.

In the simple arrangement discussed above, there is a possibility that some combinations of errors will not be detected. For example, two errors which are separated by a number of time intervals equivalent to any multiple of the number of shift register stages will leave both shift registers in identical states. This results from the fact that the second error occurs at an appropriate time to cancel out the first. If the two errors occur in a substantially random manner, the probability of error cancellation is approximately $1/n$ (where $n$ is the number of shift register stages). It has been determined however, that errors in typical transmission systems actually tend to occur in bursts. In normal situations therefore, the probability of error cancellation will be substantially less than $1/n$. While it is possible to decrease the probability of error cancellation still further by increasing the number of stages in the two registers, additionally modulo-2 adding means may be employed to greater advantage. The embodiment of the invention shown in FIG. 4 of the drawings illustrates an illustrative example of such an arrangement.

The embodiment of the invention shown in FIG. 4 is identical to the simplified arrangement of FIG. 1 with the exception that two additional modulo-2 adding means 30 and 31 are interconnected at the transmitting terminal and two additional adding means 33 and 34 are interconnected at the receiving terminal. The remaining portions of the circuit, which are designated by reference numerals identical to those of FIG. 1, function as they did in the simplified arrangement.

As shown in FIG. 4, data from the third and seventh stages of the shift register are combined by modulo-2 addition in adder 30 and the resulting sum is applied to one input of adder 31. The data train from adder 30 is designated "B" in FIG. 4. The data from the last stage of the shift register is mixed with the data from the transmission channel in adder 17 and the sum thereof applied to the other input of adder 31. In FIG. 4, this data train is designated "A." Adder 31 sums train A and train B and applies the result to the input of the first stage of the shift register 15. At the receiving terminal modulo-2 adders 32 and 34 are interconnected in a manner identical to that at the transmitting terminal.

FIG. 5 of the drawings illustrates in tabular form the operation of the embodiment of the invention shown in FIG. 4. The first column of FIG. 5 represents the received message train, M, which was transmitted from the source of binary information 11. Columns 1 through 8 represent the respective states of the eight stages of the receiving-end shift register 21. The third column from the left, column A, depicts in tabular form the data train A appearing at the output of adder 23. Column B lists the data at the output of adder 33 and column A+B represents the modulo-2 sum of columns A and B.

In order to facilitate the understanding of the error detecting capabilities of the embodiment shown in FIG. 4, it may be assumed that the message train as transmitted consists merely of a series of OFF pulses or "0's." It may then be noted that an error was committed during the second time interval, thereby producing a "1" as the second digit of the received message shown in column M of FIG. 5. Without the existence of this erroneous "1" all eight stages of the shift register 21 would have stayed in the "0" binary state during the entire message. Upon receiving this "1," however, a "1" appears at the output of adder 23, at the output of adder 24, and hence, is applied to the first stage of the register 21. This causes the first stage of register 21 to be in binary state "1" during the third time interval. As in the simplified embodiment of FIG. 1 the "error" advances from stage to stage along the shift register each time an advance pulse from source 26 is applied to the interstage gates of the register. As the error passes through the third stage during the fifth time interval, it induces another "1" in the first stage during the sixth time interval, such that two "errors" are now stored in the register. During the eighth time interval, this second "1" is in the third stage, thereby inducing still another error indication into the first stage during the ninth time interval. This process continues causing what might be termed an "explosion of 1's" within the register. The fact that a single error results in a large number of "1's" in the register stages is significant in that it substantially reduces the possibility of error cancellation without increasing the number of register stages. An absolute assurance that errors will not cancel is still not obtained, of course, since some combination of errors might be received which would still leave the shift register 21 in identical state to that of shift register 15. As can readily be appreciated, however, this possibility is so small as to present little problem.

Figures 6, 7:
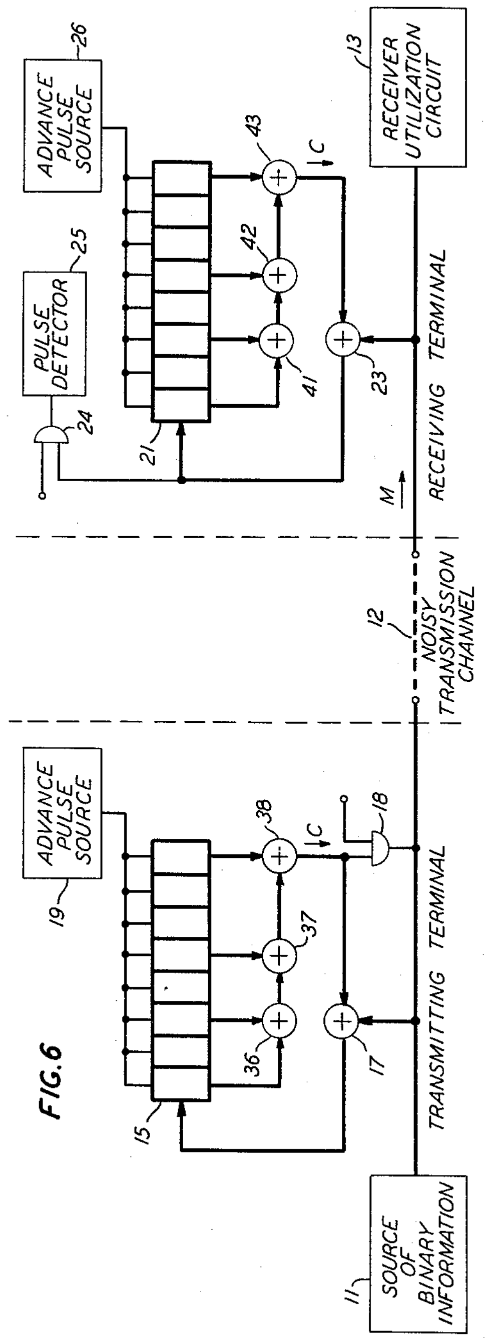
FIG. 6 illustrates still another embodiment of the present invention.
FIG. 7 is a tabular representation illustrative of the operation of the embodiment pictured in FIG. 6.

Still another embodiment of the invention is illustrated by FIG. 6 of the drawings. At before, like reference numerals had been used to designate those portions of the arrangement which are also common to the simplified embodiment shown in FIG. 1. In this arrangement three modulo-2 adders are employed at both the transmitting and receiving terminals. At the transmitting terminal adder 36 combines the output of the first and third stages of the shift register 15. The output from adder 36 is applied to one input of adder 37. The other input to adder 37 is obtained from the output of the fifth stage of shift register 15. Adder 38 combines the output from adder 37 and the data from the last stage of shift register 15 and applies the sum thereof to one input of adder 17. At the receiving terminal adders 41, 42 and 43 interconnect the output of stages 1, 3, 5 and 8 in a manner identical to that in the transmitting terminal. The output train C from the modulo-2 adder 38 represents a "parity count" of the states of stages 1, 3, 5 and 8 of shift register 15. The instantaneous state of train C will be a "1" if an odd number of the aforementioned stages are in binary state "1" and will be in state "0" if an even number (including zero) of these stages are in state "1." The arrangement shown in FIG. 6 of the drawings, like the arrangement of FIG. 4, also produces an "explosion" of error indications and, consequently, the possibility of error cancellation is quite small.

It may be noted that, if a transmission error occurs such that respective stages of shift registers 15 and 21 are in dissimilar states, the pulse train C from adder 38 will be substantially uncorrelated with the train C appearing at the output of adder 43. In consequence, it will normally be unnecessary to wait until the states of all of the stages of shift register 15 are compared with the entire contents of register 21 since an error, if it occurred at all, will normally be detected much sooner. This realization suggests that it is not necessary to fix the number of checking time intervals. Accordingly, the "rest periods" between messages may be employed regardless of their length to obtain an indication of the probability of error during the previous message. As an approximation, it may be assumed that the checking train C from the adder 38 is completely uncorrelated with the train C from register 43. The probability of detecting an error in "*k*" checking intervals may then be shown to be equal to $$\frac{1}{2k}$$

The three embodiments of the invention which are herein disclosed are, of course, merely illustrative of an application of the principles of the invention. Variations in the arrangements will be obvious to those skilled in the art without departing from the spirit and scope of the invention.

What is claimed is:

1. In combination, a transmission channel having a transmitting terminal and a receiving terminal, a source of a binary information signal, means at said transmitting terminal for directly applying said binary information signal to said transmission channel, a first shift register at said transmitting terminal and a second shift register at said receiving terminal, each of said registers being provided with an input and a plurality of outputs and each being characterized in that a signal applied to said input appears in time spaced succession at each of said outputs, means associated with each of said registers for summing signals from selected ones of said outputs with the signal from said channel and for applying the sum thereof to said input, and means for comparing the binary states of respective stages of said first and said second shift registers and for indicating a transmission error whenever a dissimilarity is detected.

2. A combination as set forth in claim 1 characterized in that said means for comparing the binary states of respective stages of said first and said second shift registers comprises gating means at said transmitting terminal for transmitting a checking signal from at least one of said outputs of said first shift register over said channel, and means at said receiving terminal for comparing said checking signal with a signal obtained in a congruent manner from said second shift register.

3. A combination as set forth in claim 1 characterized in that said means for comparing the binary states of respective stages of said first and said second shift registers comprises means associated with each of said shift registers for forming a parity count of the signals from selected ones of said outputs to form checking signals, gating means at said transmitting terminal for applying the checking signal from said first shift register to said transmitting channel, and means at said receiving terminal for comparing said checking signal from said first shift register with the checking signal from said second shift register.

References Cited in the file of this patent

UNITED STATES PATENTS 2,954,433 Lewis et al. ------------ Sept. 27, 1960

OTHER REFERENCES

An Error-Correcting Encoder and Decoder of High Efficiency (Green et al.), Proceedings of the IRE, October 1958, pp. 1742–1744.

Error Detection Circuits (Brown et al.), IBM Technical Disclosure Bulletin, vol. 4, No. 1, June 1961, pp. 25 and 26.